(12) United States Patent
Schumacher et al.

(10) Patent No.: US 8,722,829 B2
(45) Date of Patent: May 13, 2014

(54) COLD-SEALED, RECLOSEABLE PACK AND COMPOSITION FOR PRODUCING IT

(75) Inventors: Karl-Heinz Schumacher, Neustadt (DE); Florian Büsch, Speyer (DE); Dieter Urban, Speyer (DE); Cornelis Petrus Beyers, Altrip (DE)

(73) Assignee: BASF SE, Ludwigshafen (DE)

( * ) Notice: Subject to any disclaimer, the term of this patent is extended or adjusted under 35 U.S.C. 154(b) by 320 days.

(21) Appl. No.: 12/969,064

(22) Filed: Dec. 15, 2010

(65) Prior Publication Data

US 2011/0152052 A1    Jun. 23, 2011

Related U.S. Application Data

(60) Provisional application No. 61/287,719, filed on Dec. 18, 2009.

(51) Int. Cl.

| | |
|---|---|
| *C08F 118/02* | (2006.01) |
| *C08F 14/06* | (2006.01) |
| *C08F 12/28* | (2006.01) |
| *B29C 65/00* | (2006.01) |
| *B32B 27/00* | (2006.01) |
| *B32B 27/06* | (2006.01) |

(52) U.S. Cl.
USPC ........ 526/319; 526/344; 526/310; 156/304.2; 428/484.1; 428/480

(58) Field of Classification Search
USPC ................. 526/319, 344, 310; 156/304.2; 428/484.1, 480
See application file for complete search history.

(56) References Cited

U.S. PATENT DOCUMENTS

| 4,721,748 A | 1/1988 | Iovine et al. |
|---|---|---|
| 2008/0159666 A1 | 7/2008 | Exner et al. |
| 2008/0193623 A1 | 8/2008 | Guerra-Gonzalez et al. |
| 2008/0206417 A1* | 8/2008 | Kirsch et al. ............ 426/394 |
| 2009/0277560 A1 | 11/2009 | Urban et al. |

FOREIGN PATENT DOCUMENTS

| EP | 1 939 106 A1 | 7/2008 |
|---|---|---|
| WO | WO 2007/125126 A1 | 11/2007 |

OTHER PUBLICATIONS

Walter Mächtle, "Charakterisierung von Dispersionen Durch Gekoppelte $H_2O/D_2O$-Ultrazentrifugenmessungen[a]", Makromolekulare Chemie 185, 1984, pp. 1025-1039.

Houben-Weyl, "Methoden der Organischen Chemie", Makromolekulare Stoffe (Macromolecular Compounds) vol. XIV/1, 1961, pp. 411-420.

International Search Report issued Jun. 29, 20111 in PCTEP2010/069682 (with English translation of category of cited Documents).

* cited by examiner

*Primary Examiner* — William Cheung
(74) *Attorney, Agent, or Firm* — Oblon, Spivak, McClelland, Maier & Neustadt, L.L.P.

(57) ABSTRACT

Described is a recloseable pack having a cold-sealed layer of adhesive which is recloseable after the pack has been opened, the layer of adhesive comprising an emulsion polymer composed to an extent of at least 60% by weight of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers, the emulsion polymer being preparable by emulsion polymerization of free-radically polymerizable monomers in the presence of at least one protective colloid. Also described are aqueous polymer dispersions suitable for producing the pack of the invention, and polymer films coated with the polymer dispersions.

19 Claims, No Drawings

COLD-SEALED, RECLOSEABLE PACK AND COMPOSITION FOR PRODUCING IT

CROSS REFERENCE TO RELATED APPLICATION

This application claims priority under 35 U.S.C. §119(e) of provisional application No. 61/287,719, filed Dec. 18, 2009.

The invention relates to a recloseable pack having a cold-sealed layer of adhesive which is recloseable after the pack has been opened, to a method for producing the pack, to a composition in the form of an aqueous polymer dispersion for producing the pack, and to a polymer film coated with the composition.

Cold-sealable compositions are bonding compositions which, following application to and drying on a substrate, are not tacky to the touch, yet bond to one another when pressed against one another at room temperature with pressure. They differ from pressure-sensitive adhesives in the absence of, or only very low, tack at room temperature. They differ from heat-sealable compositions in that they can be adhered to one another under pressure without heat activation. Known applications of cold-sealable compositions include, for example, the closing of pouchlike packs, more particularly for foods or other heat-sensitive products in whose packaging the use of heat is undesirable, such as ice cream or chocolate, for example, or when fast packing speeds and high cycle rates are required. On account of their nontacky properties, substrates coated with them can be rolled up into rolls and stored prior to use, without adhesion to the opposite, other side of the carrier substrate, said other side being provided preferably with a release coating. Typically, for cold-seal adhesives, polymer dispersions based on natural rubber latex are used. Disadvantages associated with natural rubber latex include a comparatively high price volatility, natural fluctuations in the quality of the natural raw material, and, in particular, the allergenic potential harbored by these natural products. There is a desire for cold-sealable compositions which as far as possible are free from organic solvents, i.e., for aqueous dispersions of polymers which, after drying, form a cold-sealable coating.

For multiple recloseability of a pack it is important that the closure forces are still sufficiently high even after repeated opening. Polymer dispersions based on natural rubber or based on synthetic polymers frequently do not combine all of the properties desired for the production of recloseable packs, in terms of sufficiently high sealed seam strength on initial closing, blocking resistance with respect to a release coating, and sufficiently high reclosure forces following repeated opening and reclosing of a pack.

EP 1939106 A describes cold-sealed, recloseable packs. With the natural lattices and synthetic polymers stated therein, such as acrylate polymers and acrylate/styrene copolymers, for example, it is not readily possible to attain the desired values for the initial opening forces and for the reclosing forces.

It is an object of the invention to provide compositions for producing cold-sealable films, and recloseable packs producible with these films, that combine, with the maximum possible effect, a combination of positive properties with regard to cold sealability, blocking resistance, and recloseability, and which, furthermore, are as far as possible free from allergenic potential and from organic solvents, and which can be applied as effectively as possible by conventional application technologies (such as printing, for example), more particularly to film substrates.

The object is achieved in accordance with the invention by means of a recloseable pack having a cold-sealed layer of adhesive which is recloseable after the pack has been opened, the layer of adhesive comprising an emulsion polymer composed to an extent of at least 60% by weight of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers, the emulsion polymer being preparable by emulsion polymerization of free-radically polymerizable monomers in the presence of at least one protective colloid and having a glass transition temperature in the range from −30 to 0° C. The layer of adhesive comprising the emulsion polymer can be prepared by coating a suitable packaging substrate with a composition comprising the emulsion polymer, in the form of an aqueous polymer dispersion.

Cold-sealable means that, when two surfaces coated with a composition of the invention and dried are contacted with exertion of pressure at temperatures less than 40° C., more particularly less than 30° C. or less than 25° C., especially at room temperature (20° C.), they bond to one another. The adhesion (autoadhesion) after sealing at 20° C. and 1.4 bar is preferably at least 2 N/15 mm, measured in accordance with the method described in the examples for determining the sealed seam strength. In practical application, cold sealing takes place advantageously at ambient temperature, in other words in general at temperatures of 10 to 30° C., more particularly 15 to 25° C., and under pressures of a few millibar up to several bar above atmospheric pressure (1 bar), e.g., at 0.01 to 5 bar, more particularly from 0.1 to 3 bar above atmospheric pressure. The sealing time, i.e., the time during which the pressure is maintained, amounts, for example, to 0.1 to 20 seconds, more particularly 0.1 to 3 seconds, with 0.5 second being customary in particular.

Recloseable means that when two closure sections of a pack are contacted, after opening, at room temperature (20° C.) with exertion of gentle pressure, they bond to one another. The reclosure adhesion after at least five fold opening and reclosing at 20° C. is at least 0.5 N/15 mm, measured in accordance with the method described in the examples for determining the reclosure strength.

The polymer dispersions of the invention, following application to a substrate and following drying, form a coating which is preferably autoadhesive and is blocking-resistant with respect to polyamide surfaces. Autoadhesive means that two coated surfaces are cold-sealable to one another. The autoadhesion of the layer of adhesive after cold sealing at 20° C. and 1.4 bar is preferably at least 2 N/15 mm. Blocking-resistant means that the adhesion of a surface coated with a composition of the invention and dried, i.e., the adhesion of an unsealed layer of adhesive with respect to a polyamide surface, after loading of a circular surface with a diameter of 10 cm with 10 tonnes for one day at 20° C., is not more than 0.1 N/25 mm, measured in accordance with the method described in the examples.

Preferred packs, coated films, and compositions have or produce an initial opening force (sealed seam strength) of at least 2 N/15 mm, a blocking resistance on the part of the cold seal coating with respect to polyamide release varnish of not more than 0.1 N/25 mm, and a reclosure strength after five fold reclosing of at least 0.5 N/15 mm, measured in each case in accordance with the methods described in the examples.

The polymer dispersions of the invention are dispersions of polymers in an aqueous medium. The medium in question may be, for example, fully demineralized water, or else mixtures of water and a water-miscible solvent such as methanol, ethanol or tetrahydrofuran. It is preferred not to use any organic solvents. The solids contents of the dispersions are preferably from 15% to 75%, more preferably from 40% to 60%, more particularly greater than 50%, by weight. The solids content may be adjusted, for example, by appropriately adjusting the monomer amounts and/or the amount of water used in the emulsion polymerization. The average particle size of the polymer particles dispersed in the aqueous dispersion is preferably less than 400 nm, more particularly less than 300 nm. With particular preference the average particle size is between 140 and 250 nm. By average particle size here is meant the $d_{50}$ value of the particle size distribution, i.e., 50% by weight of the total mass of all the particles have a smaller particle diameter than the $d_{50}$ figure. The particle size distribution can be determined in a known way using the analytical ultracentrifuge (W. Mächtle, Makromolekulare Chemie 185 (1984), pp. 1025-1039). The pH of the polymer dispersion is set preferably at a pH of more than 4, more particularly at a pH of between 5 and 9.

For the inventive use, the composition may be composed solely of the water-dispersed polymer and the protective colloid. Alternatively it may also comprise further additives, e.g., fillers, antiblocking agents, dyes, flow control agents, or thickeners.

The polymer dispersions of the invention are preferably of low emulsifier content, which means that they comprise emulsifiers (nonpolymeric, amphiphilic, surface-active substances added to the polymerization mixture) in an amount of preferably less than 3% or less than 1% by weight. Particular preference is given to emulsifier-free systems. In one embodiment of the invention, therefore, the emulsion polymerization carried out in the presence of the protective colloid takes place in emulsifier-free form, i.e., without addition of emulsifiers.

In the text below, the term "(meth)acryl . . . " and similar designations are used as an abbreviating notation for "acryl . . . or methacryl . . . ".

Protective colloids are polymeric compounds which, on salvation, bind large quantities of water and are capable of stabilizing dispersions of water-insoluble polymers. In contrast to emulsifiers, they generally do not lower the interfacial tension between polymer particles and water. The number-average molecule weight of the protective colloids is preferably above 1000 g/mol, more particularly above 2000 g/mol, and preferably up to 50 000 g/mol or up to 10 000 g/mol; for example, from 1000 to 100 000 g/mol, from 1000 to 10 000 g/mol or from 2000 to 10 000 g/mol.

The protective colloids are used preferably in an amount of 0.5 to 60 parts by weight or of 1 to 30 parts by weight, more preferably from 7% to 30% by weight (more particularly when the overall solids content of the composition of the invention is more than 50% by weight), based on 100 parts by weight of the monomers to be polymerized. A comprehensive description of protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420. Protective colloids contemplated include, for example, amphiphilic polymers—that is, polymers having hydrophobic groups and hydrophilic groups. These may be natural polymers, such as starch, or synthetic polymers.

The protective colloid is preferably formed from at least 40% by weight of nonionic principal monomers, defined in more detail below, and also from a second kind of monomer, selected from ethylenically unsaturated acid monomers. The protective colloid may, furthermore, be formed optionally from additional, preferably nonionic, monomers. The protective colloid is composed preferably to an extent of at least 40%, more particularly from 40% to 80% or from 50% to 80%, by weight of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers.

Principal monomers for the protective colloid are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene. Preferred principal monomers for the protective colloid are the $C_1$ to $C_{10}$ alkyl acrylates and methacrylates, more particularly $C_1$ to $C_8$ alkyl acrylates and methacrylates, and vinylaromatics, especially styrene and alpha-methylstyrene, and mixtures thereof. Very particular preference is given to methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, alpha-methylstyrene, and mixtures of these monomers.

The protective colloid is further composed preferably to an extent of at least 15%, more particularly from 15% to 60% or from 20% to 50%, by weight of ethylenically unsaturated acid monomers. Ethylenically unsaturated acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Suitable ethylenically unsaturated sulfonic acids include, for example, vinylsulfonic acid, styrenesulfonic acid, acrylamidomethylpropanesulfonic acid, sulfopropyl acrylate, and sulfopropyl methacrylate. Preference is given to acrylic acid and methacrylic acid and a mixture thereof, particular preference to acrylic acid. The acid monomers can be used in the form of the free acids and also in a form partially or fully neutralized with suitable bases, for the polymerization. It is preferred to use aqueous sodium or potassium hydroxide solution or ammonia as neutralizing agent.

In one preferred embodiment the protective colloid
(i) is used in an amount of 7% to 30% by weight, based on 100 parts by weight of the monomers to be polymerized,
(ii) is composed to an extent of at least 40% by weight of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers, (iii) is composed to an extent of at least 15% by weight of ethylenically unsaturated acid monomers preferably selected from acrylic acid, methacrylic acid, and a mixture thereof, and (iv) has a number-average molecular weight of 1000 to 10 000.

The active substance that functions as binder in the layer of adhesive is the emulsion polymer preparable by emulsion polymerization of free-radically polymerizable monomers, referred to below as adhesive polymer. The adhesive polymer is composed preferably to an extent of at least 60% by weight, more preferably to an extent of at least 80% by weight, e.g., from 80% to 100% by weight, more preferably to an extent of at least 90% by weight, or to an extent of 100% by weight, of one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth) acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, α- and p-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene.

Preferred principal monomers for the adhesive polymer are the $C_1$ to $C_{10}$ alkyl acrylates and methacrylates, more particularly $C_1$ to $C_8$ alkyl acrylates and methacrylates, and vinylaromatics, especially styrene, and mixtures thereof. Very particular preference is given to methyl acrylate, methyl methacrylate, ethyl acrylate, n-butyl acrylate, n-butyl methacrylate, n-hexyl acrylate, octyl acrylate, and 2-ethylhexyl acrylate, 2-propylheptyl acrylate, styrene, and mixtures of these monomers.

Besides the principal monomers, the adhesive polymer may comprise further monomers, examples being monomers with carboxylic acid, sulfonic acid or phosphonic acid groups. Carboxylic acid groups are preferred. Examples include acrylic acid, methacrylic acid, itaconic acid, maleic acid or fumaric acid. Further monomers are, for example, monomers also comprising hydroxyl groups, more particularly $C_1$-$C_{10}$ hydroxyalkyl (meth)acrylates, and also (meth) acrylamide. Further monomers that may be mentioned include phenyloxyethylglycol mono(meth)acrylate, glycidyl acrylate, glycidyl methacrylate, and amino (meth)acrylates such as 2-aminoethyl (meth)acrylate. Further monomers that may be mentioned also include crosslinking monomers.

The adhesive polymer, or the emulsion polymer prepared by emulsion polymerization, is preferably free from acid groups, however.

More particularly the adhesive polymer is composed to an extent of at least 60% by weight, more preferably to an extent of at least 80%, e.g., from 60% to 100%, and very preferably at least 95%, or 100%, by weight of at least one $C_1$ to $C_{20}$ alkyl acrylate, at least one $C_1$ to $C_{20}$ alkyl methacrylate, a mixture thereof, or a mixture thereof with styrene. In one embodiment the binder is the homopolymer of ethyl acrylate.

The adhesive polymer, or the emulsion polymer prepared in the presence of at least one protective colloid, has a glass transition temperature of −30 to 0° C., preferably of −28 to −5° C. The glass transition temperature can be determined by differential scanning calorimetry (ASTM D 3418-08, midpoint temperature).

The polymers can be prepared by emulsion polymerization, the product then being an emulsion polymer. The emulsion polymerization is generally carried out using ionic and/or nonionic emulsifiers and/or protective colloids or stabilizers as surface-active compounds, in order to support the dispersing of the monomers in the aqueous medium. In accordance with the invention it is possible to employ one or more of the abovementioned protective colloids as sole dispersant, i.e., without the addition of emulsifiers. If desired, however, small amounts of emulsifiers can also be used as well. The emulsion polymerization preferably takes place in the presence of at least one protective colloid without the addition of a nonpolymeric emulsifier.

If emulsifiers are used as additional surface-active substances, they are preferably anionic or nonionic emulsifiers. Suitable emulsifiers are exemplified by ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. Other suitable emulsifiers are compounds of the general formula

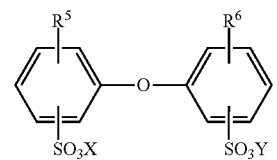

in which $R^5$ and $R^6$ are hydrogen or $C_4$ to $C_{14}$ alkyl but are not simultaneously hydrogen, and X and Y can be alkali metal ions and/or ammonium ions. Preferably $R^5$, $R^6$ are linear or branched alkyl radicals having 6 to 18 C atoms or hydrogen, and more particularly having 6, 12, and 16 C atoms, with $R^5$ and $R^6$ not both simultaneously being hydrogen. X and Y are preferably sodium, potassium or ammonium ions, with sodium being particularly preferred. Particularly advantageous compounds II are those in which X and Y are sodium, $R^5$ is a branched alkyl radical having 12 C atoms, and $R^6$ is hydrogen or $R^5$. Oftentimes use is made of technical mixtures which comprise a fraction of 50% to 90% by weight of the monoalkylated product, an example being Dowfax® 2A1

(trade mark of the Dow Chemical Company). Suitable emulsifiers are also found in Houben-Weyl, Methoden der organischen Chemie, volume 14/1, Makromolekulare Stoffe, Georg Thieme Verlag, Stuttgart, 1961, pages 192 to 208. Examples of emulsifier trade names include Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, and Emulphor® NPS 25. Also suitable are copolymerizable emulsifiers which comprise a free-radically polymerizable, ethylenically unsaturated double bond, examples being reactive anionic emulsifiers such as Adeka® Resoap SR-10.

The emulsion polymerization takes place in general at 30 to 130, preferably 50 to 90° C. The polymerization medium may be composed either only of water or else of mixtures of water and water-miscible liquids such as methanol. It is preferred to use just water. The emulsion polymerization can be carried out either as a batch operation or in the form of a feed process, including staged or gradient procedures. Preference is given to the feed process, in which a portion of the polymerization batch is made the initial charge, heated to the polymerization temperature, and partially polymerized, and then the remainder of the polymerization batch, usually by way of two or more spatially separate feeds, of which one or more comprise the monomers in pure form or in emulsified form, is supplied continuously or else in stages.

The emulsion polymerization is carried out in the presence of at least one protective colloid. This means that the protective colloids are included in the initial charge or supplied together with monomers to the polymerization vessel. They are preferably included in the initial emulsion polymerization charge, while any additionally employed emulsifiers may also be supplied together with the monomers in the course of the polymerization.

For the emulsion polymerization it is possible to use the customary and known auxiliaries, such as water-soluble initiators and regulators, for example. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one, usually inorganic, reducing agent and one organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems may be used in the company of soluble metal compounds whose metallic component is able to exist in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinate, or tert-butyl hydroperoxide/ascorbic acid. The individual components, the reducing component for example, may also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1% to 30%, preferably 0.5% to 20%, more preferably 1.0% to 10%, by weight, based on the solution. The amount of the initiators is generally 0.1% to 10% by weight, preferably 0.5% to 5% by weight, based on the monomers to be polymerized. It is also possible for two or more different initiators to be used in the emulsion polymerization. For the removal of the residual monomers, it is usual to add initiator after the end of the actual emulsion polymerization as well.

In the polymerization it is possible to use regulators, in amounts, for example, of 0 to 0.8 part by weight, based on 100 parts by weight of the monomers to be polymerized, these regulators reducing the molar mass. Suitable examples include compounds having a thiol group such as tert-butyl mercaptan, thioglycolic acid ethylacrylic esters, mercaptoethanol, mercaptopropyltrimethoxysilane or tert-dodecyl mercaptan. Additionally it is possible to use regulators without a thiol group, such as terpinolene, for example. In one preferred embodiment the emulsion polymer is prepared using 0.05% to 0.5% by weight, based on the monomer amount, of at least one molecular weight regulator.

In one embodiment of the invention the composition is one in which the emulsion polymer prepared by emulsion polymerization is a straight acrylate or a styrene acrylate, i.e., is composed exclusively of alkyl (meth)acrylate monomers or of a combination of alkyl (meth)acrylate monomers and styrene, the alkyl group preferably having 1 to 8 C atoms and preferably at least one monomer being ethyl acrylate or n-butyl acrylate.

One embodiment of the invention provides a recloseable pack wherein the emulsion polymer used for cold sealing and prepared by emulsion polymerization in the presence of a protective colloid has a glass transition temperature of −30 to 0° C. and is formed 100% of monomers selected from acrylic esters, methacrylic esters, styrene, and a mixture thereof, and the protective colloid (i) is used in an amount of 7 to 30% by weight, based on the amount of the emulsion polymer, (ii) is composed to an extent of at least 40% by weight of principal monomers selected from the group consisting of C1 to C20 alkyl (meth)acrylates, styrene, alpha-methylstyrene, and a mixture thereof, (iii) is composed to an extent of at least 15% by weight of ethylenically unsaturated acid monomers preferably selected from acrylic acid, methacrylic acid, and a mixture thereof, and (iv) has a number-average molecular weight of 1000 to 10 000.

The invention also provides a composition in the form of an aqueous polymer dispersion being suitable for producing cold-sealable, recloseable packaging materials, and the polymer dispersion being preparable by emulsion polymerization of free-radically polymerizable monomers in the presence of at least one protective colloid, where the emulsion polymer prepared by emulsion polymerization has a glass transition temperature of −30 to 0° C. and is formed 100% of monomers selected from acrylic esters, methacrylic esters, styrene, and a mixture thereof, and the protective colloid (i) is used in an amount of 7 to 30% by weight, based on the amount of the emulsion polymer, (ii) is composed to an extent of at least 40% by weight of principal monomers selected from the group consisting of C1 to C20 alkyl (meth)acrylates, styrene, alpha-methylstyrene, and a mixture thereof, (iii) is composed to an extent of at least 15% by weight of ethylenically unsaturated acid monomers preferably selected from acrylic acid, methacrylic acid, and a mixture thereof, and
(iv) has a number-average molecular weight of 1000 to 10 000.

This composition is preferably used to produce the pack of the invention. The polymer dispersion of this composition, following application to a substrate and following drying, forms a coating which at room temperature is autoadhesive and is blocking-resistant with respect to polyamide surfaces.

The invention also provides for the use of the aqueous polymer dispersions described above for producing a cold-sealable pack which is recloseable after initial opening. Following application to a substrate and following drying, the polymer dispersion forms a coating which at room temperature is blocking-resistant and is autoadhesive.

The composition of the invention is suitable for cold-sealing two arbitrary substrates, in which case
the two substrates, at the points which are to be adhered, having been or being each coated with the composition of the invention, and
the two substrates, if desired with exertion of pressure, being contacted, the temperature in the coated composition being less than 40° C. (cold sealing; see above).

Substrates contemplated for bonding include any desired substrates, examples being substrates made of wood, metal, paper or plastic, which may be bonded to one another in any desired combination, at least one substrate preferably being a polymer film. For this purpose the substrates are coated with the composition of the invention. Coating may take place in a conventional manner, as for example by printing, more particularly by flexographic printing or by gravure printing (intaglio printing). Customary coat thicknesses (after drying) are, for example, 1 to 30 $g/m^2$, preferably 1 to 10 $g/m^2$ or 1 to 5 $g/m^2$. The composition of the invention is suitable especially for producing packaging. Packaging contemplated is that composed of any desired materials, such as of paper or, preferably, of plastic, for example. Examples cited may include packaging made from polymer films, including, if desired, metallized polymer films, e.g., of polyethylene, polypropylene, PVC, polyester and/or polyacetate.

Especially suitable for producing packaging is a double-sidedly coated carrier, the carrier having on one side (referred to below as face) an outer layer of the composition of the invention, and having on the other side (referred to below as reverse) an outer release coating. The carrier may be composed, for example, of one of the abovementioned polymer films, or metallized polymer films, mention being made in particular of films of oriented polypropylene, polyethylene, preferably high-density polyethylene, or polyethylene terephthalate. The polymer films may also have been corona-pretreated. The composition of the invention may be coated directly onto the face of the carrier, although between the carrier and the composition of the invention there may also be other layers, examples being primer layers, barrier layers or colored or monochrome printing-ink layers, although printing ink layers are preferably located on the reverse of the carrier. It is essential that the layer of the composition of the invention be located on the outside.

The release coating may be of any desired material, and may be a polymer film, e.g., a film of oriented polypropylene, which is laminated on or coextruded, or a liquid varnish, such as a polyamide varnish, for example, which is applied and filmed; it is essential that the layer of adhesive applied to the face of the carrier (in the present case, the composition of the invention) does not adhere to the release coating (blocking resistance). The carrier is generally rolled up and later processed from the roll. In the course of rolling, the face and the reverse of the carrier come into direct contact. Adhesion of the face to the reverse would make the carrier unusable. Between the release coating and the carrier there may be further layers; those contemplated include, in turn, layers of a primer which improves the adhesion, and printing ink layers. Another function of the outer release coating is to protect the lower layers, more particularly the printing ink layer, from external exposures.

Preferred carriers have the following construction, the sequence of the layers corresponds to the spatial arrangement:
adhesive layer (composition of the invention)
carrier
optional primer layer
optional printing ink layer
release coating.

The double-sidedly coated carrier is used more particularly for producing packaging, for which purpose it is preferably bonded to itself by cold sealing, with the faces coated with the outer composition of the invention being brought into contact in each case. It is essential here that both carriers to be bonded are coated with the composition of the invention at the points that are to be bonded and that form the subsequent sealed seam. The packaging is sealed together by cold sealing of the adhesive layer as soon as the packaged contents have been introduced. The packaging is suitable especially for comestibles.

In the cold-sealed, recloseable pack of the invention, the cold sealing is formed preferably between a first and a second closure section, the bonding force of the cold seal to the first and second sections being greater than the bonding force within the cold seal, so that the cold seal is parted and bonds partly to the first and partly to the second closure section when the closure is opened; in other words, when the pack is opened, there is cohesive fracture of the sealing layer.

When the pack is being produced, the composition used for the cold seal is applied preferably in an amount of 2 to 5 $g/m^2$ (based on solids) to each closure section.

The closure forces of the pack of the invention are preferably such that the initial opening force is at least 2 N/15 mm, preferably 2.5 to 5 N/15 mm, measured in accordance with the method described in the examples. The opening force for one or more reclosing operations is preferably at least 0.5 N/15 mm, preferably 0.5 to 2 N/15 mm or 1 to 1.5 N/15 mm, measured in accordance with the method described in the examples.

Also provided by the invention is a coated polymer film, where a polymer carrier film is coated at least partly, i.e., at least at the areas forming the subsequent sealed seam, with a composition of the invention. The polymer film of the invention preferably has a first side and a second side, the first side as outer layer being coated at least partly with a composition of the invention, and the second side having as outer layer a release coating. In one embodiment the polymer carrier film of the coated polymer film of the invention is composed of polyethylene or oriented polypropylene, and the release coating is formed on the basis of polyamide.

The invention also provides for the use of the coated polymer film of the invention for producing packaging, more particularly film packaging for comestibles.

The invention also provides a method for producing a recloseable, cold-sealed pack, in which a composition of the invention as described in more detail above is applied in the form of an aqueous polymer dispersion to a packaging substrate and is dried and cold-sealed.

EXAMPLES

Unless the context dictates otherwise, the figures in percent always denote percent by weight. A content datum relates to the content in aqueous solution or dispersion.

The ingredients used were as follows:
Oppalyte® 33MW247: film recommended for cold-seal applications, made of surface-treated, biaxially oriented polypropylene, from Exxon Mobil Corp.
Treofan® SHD40: film recommended for cold-seal applications, made of oriented polypropylene, from Treofan GmbH & Co. KG
Gecko® Coldseal Release varnish 70 GL 282547: polyamide release varnish, solvent-based, from Huber Group Cold-Seal Testing
Coating with Polyamide Release Varnish A 0.07 mm wire applicator is used to apply Gecko® Coldseal Release varnish 70 GL 282547 to the pretreated side of the OPP film SHD40, and the applied varnish is dried with hot air for 10 seconds. Release varnish application rate: about 1.0 g/m².

Coating of the OPP Film

With the bar applicator, the adhesive is applied to the pretreated side of the OPP film Oppalyte® 33MW247 and dried at 70° C. for 1 minute. The coated film is lined with an OPP film coated with release varnish.

Sealed Seam Strength (SSS)

Strips 15 mm wide are cut from the coated film and sealed to one another (adhesive to adhesive) on the sealing device for 0.5 second with 200 N (1.4 bar). 30 seconds after sealing has taken place, the peel strengths in N/15 mm are ascertained at a peel speed of 50 mm/min.

Blocking Test

The coated film is placed against the release-varnish-coated side of an SHD40 OPP film, and a circular section having a diameter of 10 cm is loaded with 10 tonnes for 1 day. Thereafter the peel strengths of strips 25 mm wide are determined in N/25 mm, with a peel speed of 800 mm/min.

Reclose Strength

The test specimens are produced as for the testing of the sealed seam strength, and are likewise sealed to one another. The seal is then opened and closed again five times by hand. For closing, a manual roller weighing 2 kg is rolled once back and once forth over the seal in each case. The sealed seam strength determined then is the reclose strength after five fold closing.

All tests take place at room temperature (20° C.).

Example B1

Poly(ethyl acrylate), prepared by emulsion polymerization in the presence of 0.2 part by weight (based on 100 parts by weight of monomer) of t-dodecyl mercaptan and also in the presence of a protective colloid having a number-average molecular weight of 4000, prepared from 44 parts by weight of acrylic acid and 56 parts by weight of n-butyl acrylate.

Glass transition temperature: −25° C.

Example B2

Poly(ethyl acrylate), prepared by emulsion polymerization in the presence of 0.2 part by weight (based on 100 parts by weight of monomer) of t-dodecyl mercaptan and also in the presence of a protective colloid having a number-average molecular weight of 9000, prepared from 32 parts by weight of acrylic acid, 24 parts by weight of styrene, 33 parts by weight of alpha-methylstyrene, 5 parts by weight of ethylhexyl acrylate, and 5 parts by weight of isooctyl acrylate.

Glass transition temperature: −25° C.

Example B3

Poly(ethyl acrylate), prepared by emulsion polymerization in the presence of 0.2 part by weight (based on 100 parts by weight of monomer) of t-dodecyl mercaptan and also in the presence of a protective colloid having a number-average molecular weight of 9200, prepared from 33 parts by weight of acrylic acid, 32 parts by weight of styrene, 30 parts by weight of alpha-methylstyrene, and 5 parts by weight of isooctyl acrylate.

Glass transition temperature: −25° C.

Example B4

Copolymer of 70 parts by weight of n-butyl acrylate and 30 parts by weight of styrene, prepared by emulsion polymerization in the presence of 0.2 part by weight (based on 100 parts by weight of monomer) of t-dodecyl mercaptan and also in the presence of a protective colloid having a number-average molecular weight of 4000, prepared from 44 parts by weight of acrylic acid and 56 parts by weight of n-butyl acrylate.

Glass transition temperature: −15° C.

Example B5

Like Example B1, without t-dodecyl mercaptan.

Comparative Example C1

Commercial natural rubber latex
NK Latex from Eukalin, solids content 55%

Comparative Example C2

Copolymer of 70 parts by weight of ethyl acrylate and 30 parts by weight of styrene, prepared by emulsion polymerization in the presence of 0.2 part by weight (based on 100 parts by weight of monomer) of t-dodecyl mercaptan and also in the presence of a protective colloid having a number-average molecular weight of 4000, prepared from 44 parts by weight of acrylic acid and 56 parts by weight of n-butyl acrylate.

Glass transition temperature: +5° C.

Comparative Example C3

Copolymer of 44 parts by weight of ethyl acrylate and 56 parts by weight of n-butyl acrylate, prepared by emulsion polymerization in the presence of 0.2 part by weight (based on 100 parts by weight of monomer) of t-dodecyl mercaptan and also in the presence of a protective colloid having a number-average molecular weight of 4000, prepared from 44 parts by weight of acrylic acid and 56 parts by weight of n-butyl acrylate.

Glass transition temperature: −36° C.

Comparative Example C4

Like Example B1, prepared by emulsion polymerization in the presence of emulsifiers, without protective colloid.

The results of the cold-sealing tests are set out in Table 1.

TABLE 1

Results of the cold-sealing tests

| | Sealed seam strength [N/15 mm] | Blocking resistance with respect to release coating [N/25 mm] | Reclose strength after 5-fold reclosing [N/15 mm] |
|---|---|---|---|
| B1 | 4.0 | 0.05 | 1.0 |
| B2 | 2.6 | 0.06 | 0.9 |
| B3 | 3.0 | 0.05 | 1.0 |
| B4 | 2.3 | 0.1 | 0.8 |
| B5 | 3.0 | 0.06 | 1.0 |
| C1 | 2.0 | 0.0 | 0.0 |
| C2 | 0.7 | 0.0 | 0.0 |
| C3 | 0.7 | 0.43 | 0.5 |
| C4 | 0.8 | 0.07 | 0.4 |

The inventive compositions B1 to B5 are notable relative to the comparative compositions C1 to C4 for an unexpected combination of advantageous properties, including a high sealed seam strength of more than 2 N/15 mm, good blocking resistance of not more than 0.1 N/25 mm, and a high reclose strength of more than 0.5 N/15 mm.

The invention claimed is:

1. A reclosable pack, comprising:
   a cold-sealed layer of adhesive which is recloseable after the pack has been opened, wherein
   the adhesive comprises an emulsion polymer comprising at least 60% by weight of principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof, wherein
   the emulsion polymer is prepared by emulsion polymerization of free-radically polymerizable monomers in the presence of at least one protective colloid and has a glass transition temperature of from −30 to 0° C.,
   wherein the protective colloid:
   (i) is in an amount of 7% to 30% by weight, based on 100 parts by weight of the polymerizable monomers,
   (ii) comprises at least 40% by weight of the principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof,
   (iii) comprises at least 15% by weight of ethylenically unsaturated acid monomers optionally selected from the group consisting of acrylic acid, methacrylic acid, and any mixture thereof, and
   (iv) has a number-average molecular weight of 1000 to 10 000, and
   wherein the cold-sealed layer is formed by cold-sealing of two substrates, wherein each of the substrates is coated with an autoadhesive coating comprising the emulsion polymer.

2. The reclosable pack according to claim 1, wherein the emulsion polymer is free from acid groups.

3. The reclosable pack according to claim 1, wherein the emulsion polymer comprises 60% to 100% by weight of at least one $C_1$ to $C_{20}$ alkyl acrylate, at least one $C_1$ to $C_{20}$ alkyl methacrylate, a mixture thereof, or a mixture thereof with styrene.

4. The reclosable pack according to claim 1, wherein the adhesive is formed between a first and a second section of a closure, a bonding force of the adhesive to the first and second sections is greater than a bonding force within the adhesive, so that the adhesive is separated and bonds partly to the first and partly to the second section when the closure is opened.

5. The reclosable pack according to claim 1, wherein an initial opening force of the pack is at least 2 N/15 mm and opening forces for one or more reclosing operations of the pack are at least 0.5 N/15 mm.

6. The reclosable pack according to claim 4, wherein the adhesive is applied in an amount of 2 to 5 g/m$^2$ to each section of the closure.

7. The reclosable pack according to claim 1, wherein the emulsion polymer is prepared by using 0.05% to 0.5% by weight, based on the polymerizable monomers, of at least one molecular weight regulator.

8. The reclosable pack according to claim 1, wherein
   an autoadhesion of the adhesive after cold sealing at 20° C. and 1.4 bar is at least 2 N/15 mm and
   an adhesion of the adhesive before cold sealing with respect to a polyamide surface after loading of a circular surface with a diameter of 10 cm with 10 tonnes for one day at 20° C. is no more than 0.1 N/25 mm.

9. The reclosable pack according to claim 1, wherein the emulsion polymer is prepared by emulsion polymerization of monomers selected from the group consisting of an acrylic ester, a methacrylic ester, styrene, and any mixture thereof, and
   the protective colloid
   (i) is in an amount of 7% to 30% by weight, based on a total amount of the emulsion polymer,
   (ii) comprises at least 40% by weight of the principal monomers selected from the group consisting of a C1 to C20 alkyl (meth)acrylate, styrene, alpha-methylstyrene, and any mixture thereof,
   (iii) comprises at least 15% by weight of ethylenically unsaturated acid monomers optionally selected from the group consisting of acrylic acid, methacrylic acid, and any mixture thereof, and
   (iv) has a number-average molecular weight of 1000 to 10 000.

10. The reclosable pack according to claim 1, wherein the emulsion polymerization takes place in the presence of the protective colloid without addition of a nonpolymeric emulsifier.

11. A composition of an aqueous polymer dispersion, wherein the aqueous polymer dispersion
   is suitable for producing cold-sealable, reclosable packaging materials,
   is an emulsion polymer prepared by emulsion polymerization of free-radically polymerizable monomers in the presence of at least one protective colloid,
   has a glass transition temperature of −30 to 0° C., and
   is formed 100% of monomers selected from the group consisting of an acrylic ester, a methacrylic ester, styrene, and any mixture thereof, and the protective colloid
(i) is in an amount of 7% to 30% by weight, based on a total amount of the emulsion polymer,
(ii) comprises at least 40% by weight of principal monomers selected from the group consisting of a C1 to C20 alkyl (meth)acrylate, styrene, alpha-methylstyrene, and any mixture thereof,
(iii) comprises at least 15% by weight of ethylenically unsaturated acid monomers optionally selected from the group consisting of acrylic acid, methacrylic acid, and any mixture thereof, and
(iv) has a number-average molecular weight of 1000 to 10 000.

12. The composition according to claim 11, wherein the aqueous polymer dispersion, after application to a substrate and drying, forms an autoadhesive coating at room temperature and is blocking-resistant with respect to polyamide surfaces.

13. A coated polymer film comprising a polymer carrier film, wherein the polymer carrier film is at least partly coated with the composition according to claim 11.

14. The coated polymer film according to claim 13, wherein the polymer carrier film comprises a first side and a second side, the first side is coated, as an outer layer, at least partly with the composition, and the second side comprises, as an outer layer, a release coating.

15. The coated polymer film according to claim 14, wherein the polymer carrier film comprises polyethylene or oriented polypropylene and the release coating is formed on the basis of polyamide.

16. A cold-sealable pack which is reclosable after initial opening comprising an aqueous polymer dispersion,
wherein the aqueous polymer dispersion comprises
a water-dispersed emulsion polymer comprising at least 60% by weight of principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof, wherein
the emulsion polymer is prepared by emulsion polymerization of free-radically polymerizable monomers in the presence of at least one protective colloid and has a glass transition temperature of from −30 to 0° C.,
wherein the protective colloid:
(i) is in an amount of 7% to 30% by weight, based on 100 parts by weight of the polymerizable monomers,
(ii) comprises at least 40% by weight of the principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof,
(iii) comprises at least 15% by weight of ethylenically unsaturated acid monomers optionally selected from the group consisting of acrylic acid, methacrylic acid, and any mixture thereof, and
(iv) has a number-average molecular weight of 1000 to 10 000, and
wherein the cold-sealed layer is formed by cold-sealing of two substrates, wherein each of the substrates is coated with an autoadhesive coating comprising the emulsion polymer.

17. The cold-sealable pack according to claim 16, wherein the aqueous polymer dispersion, after application to a substrate and drying, forms a block-resistant and autoadhesive coating at room temperature.

18. The cold-sealable pack according to claim 17, wherein the substrate is a polymer film.

19. A method for producing a reclosable, cold-sealed pack, the method comprising:
applying an aqueous polymer dispersion to a packaging substrate,
drying the polymer dispersion, and
cold-sealing the pack,
wherein
the aqueous polymer dispersion comprises an emulsion polymer comprising at least 60% by weight of principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof, wherein
the emulsion polymer is prepared by emulsion polymerization of free-radically polymerizable monomers in the presence of at least one protective colloid and has a glass transition temperature of from −30 to 0° C.,
wherein the protective colloid:
(i) is in an amount of 7% to 30% by weight, based on 100 parts by weight of the polymerizable monomers,
(ii) comprises at least 40% by weight of the principal monomers selected from the group consisting of a C1 to C20 alkyl (meth)acrylate, a vinyl ester of carboxylic acid comprising up to 20 C atoms, a vinylaromatic comprising up to 20 C atoms, an ethylenically unsaturated nitrile, a vinyl halide, a vinyl ether comprising 1 to 10 C atoms, an aliphatic hydrocarbon comprising 2 to 8 C atoms and one or two double bonds, and any mixture thereof,
(iii) comprises at least 15% by weight of ethylenically unsaturated acid monomers optionally selected from the group consisting of acrylic acid, methacrylic acid, and any mixture thereof, and
(iv) has a number-average molecular weight of 1000 to 10 000, and
wherein the cold-sealed layer is formed by cold-sealing of two substrates, wherein each of the substrates is coated with an autoadhesive coating comprising the emulsion polymer.

* * * * *